May 19, 1931.  R. M. CRITCHFIELD  1,806,335
WINDSHIELD WIPER
Filed Jan. 12, 1929  2 Sheets-Sheet 2
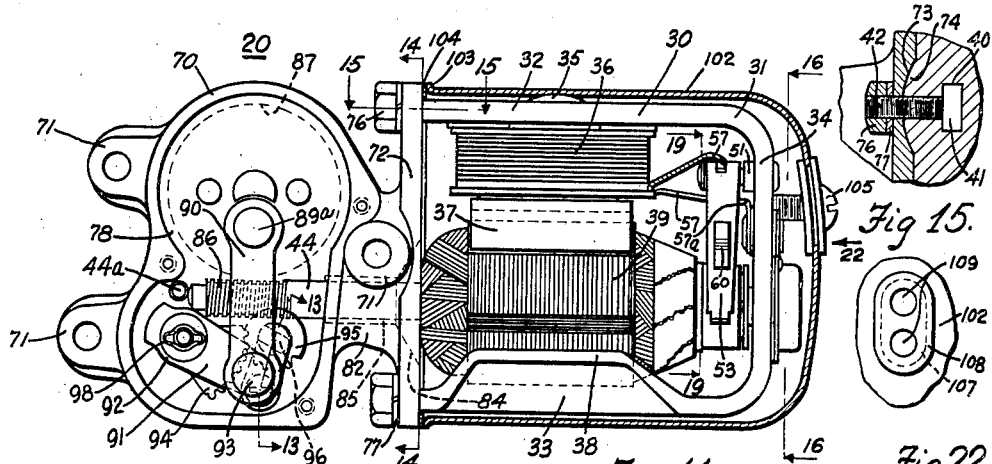
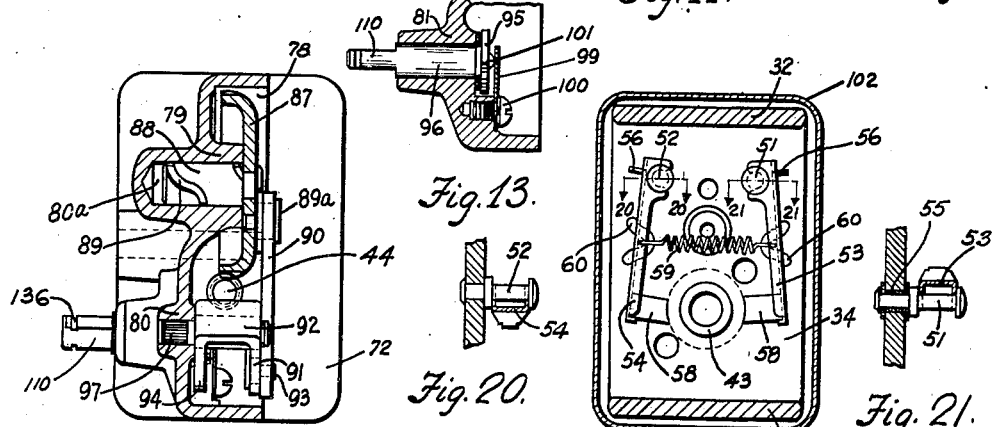
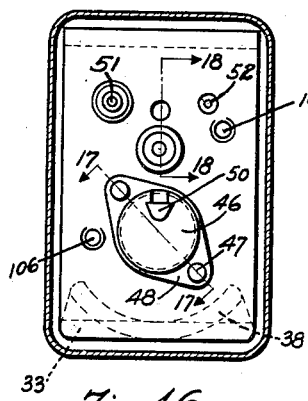
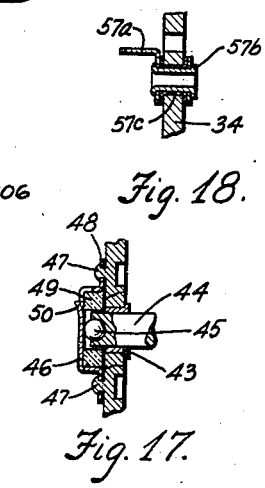
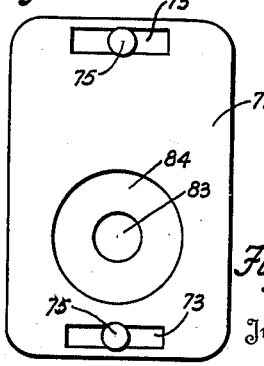
Inventor
Robert M. Critchfield
By Spencer, Hardman and Felix
Attorney Patented May 19, 1931

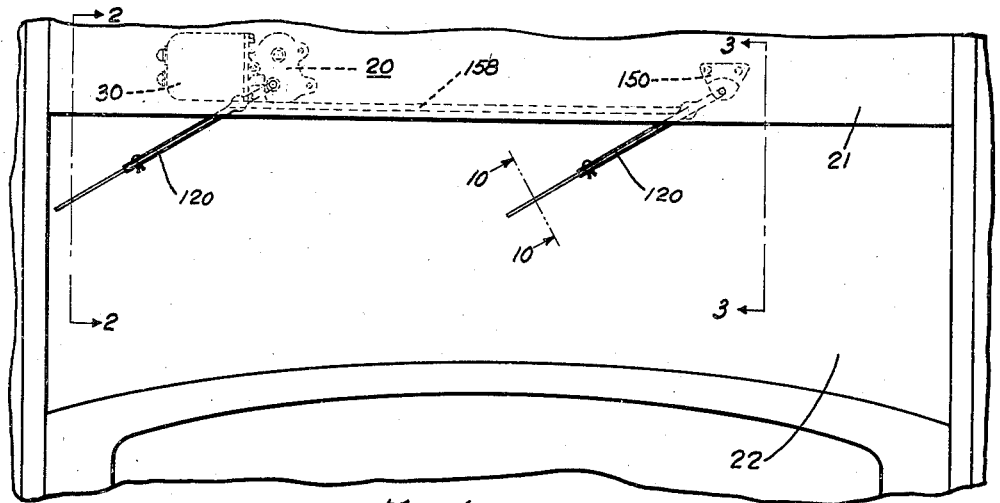
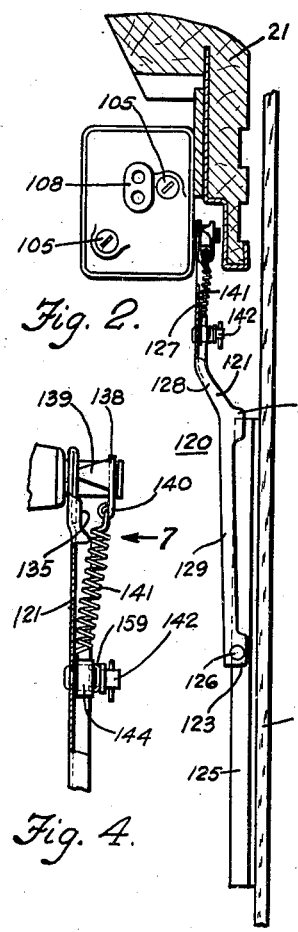
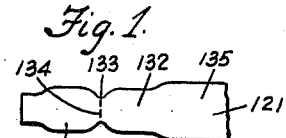
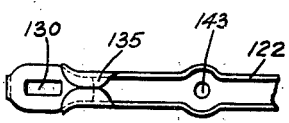
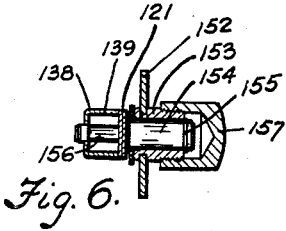
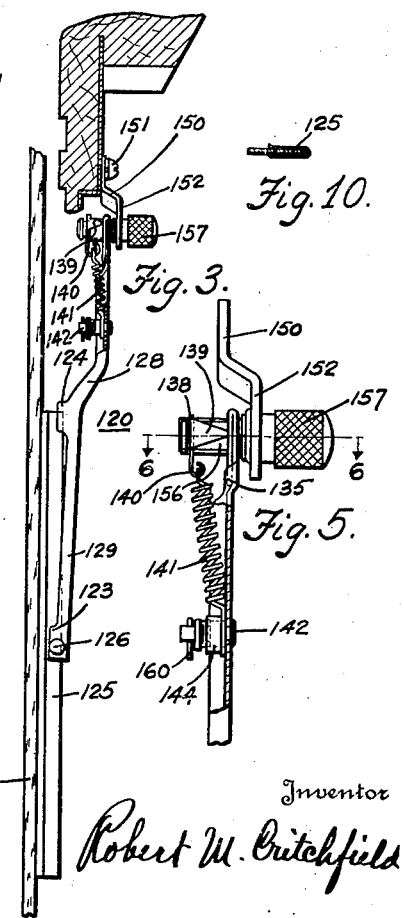

1,806,335

UNITED STATES PATENT OFFICE

ROBERT M. CRITCHFIELD, OF ANDERSON, INDIANA, ASSIGNOR TO DELCO-REMY CORPORATION, OF DAYTON, OHIO, A CORPORATION OF DELAWARE

WINDSHIELD WIPER

Application filed January 12, 1929. Serial No. 332,112.

This invention relates to windshield cleaners for automobile and other vehicles, adapted to wipe from the outside of the windshield rain, snow or other forms of moisture that would otherwise obscure the vision of the driver.

The general object of the invention is to provide a new and improved windshield cleaner which is efficient in operation and compact in form, thereby reducing to a minimum the space occupied by the cleaner mechanism.

A further object of the invention is to provide a wiper mechanism that will operate smoothly and that will move the wiper blade over the windshield or glass without the common chattering or vibration effect that is usually attended upon such mechanism.

A further object is to provide means for guiding the wiper in its movement and insuring perfect alignment of the wiper mechanism with the windshield to be cleaned, and also to provide automatic adjustment of the wiper blade with respect to the windshield surface.

Further objects and advantages of the present invention will be apparent from the following description, reference being had to the accompanying drawings wherein a preferred embodiment of one form of the present invention is clearly shown.

In the drawings:

Fig. 1 is a view in elevation of a vehicle windshield provided with the improved cleaning mechanism including a pair of wipers operated in tandem.

Fig. 2 is an end view of the cleaning mechanism and its mount, taken substantially on the line 2—2 of Fig. 1.

Fig. 3 is a similar view showing the tandem wiper and its mount substantially as viewed on the line 3—3 of Fig. 1.

Figs. 4 and 5 are detail views showing the connection of the wiper arm with their driving connections and support as disclosed in Figs. 2 and 3 respectively.

Fig. 6 is a cross section of the connection of the wiper arm and support as viewed through line 6—6 of Fig. 5.

Fig. 7 is a view in elevation of the wiper arm connection as viewed in the direction of the arrow 7 in Fig. 4.

Fig. 8 is a detail showing the method of forming the driving connection of the wiper arm.

Fig. 9 is a view of the blank from which the driving connection of the arm is formed.

Fig. 10 is a cross section of the wiper blade as viewed along the line 10—10 of the Fig. 1.

Fig. 11 is a view in elevation of the wiper operator mechanism with certain parts shown in section.

Fig. 12 is a fragmentary sectional view through the gear housing and gear train.

Fig. 13 is a detail in section on the line 13—13 of Fig. 11, showing the wiper shaft and retaining means in relation to the gear casing.

Fig. 14 is an end elevation of the gear housing showing the motor attaching flange, and is taken substantially on the line 14—14 of Fig. 11.

Fig. 15 is a detail of the connection of the motor frame and gear housing showing certain parts in section as viewed on the line 15—15 of Fig. 11.

Fig. 16 is a sectional view through the motor housing showing the motor frame and associated parts as viewed on the line 16—16 of Fig. 11.

Fig. 17 is a detail of an end bearing of the motor shaft as viewed on the line 17—17 of Fig. 16.

Fig. 18 is a sectional view along the line 18—18 of Fig. 16, showing the terminal clip and means for mounting.

Fig. 19 is a section through the windshield motor along the line 19—19 of Fig. 11 showing certain parts in elevation.

Figs. 20 and 21 are details of the brush pivot mounting showing certain parts in section as viewed on the lines 20—20 and 21—21 respectively of Fig. 19.

Fig. 22 is a fragmentary view of a portion of the motor case supporting the terminal insulating grommet as viewed in the direction of the arrow 22 in Fig. 11.

As illustrated in the drawings, the wiper operating device 20 is mounted on a rail 21 of the windshield 22, and comprises an electric motor 30 mounted on and supported by a gear housing and supporting member 70, which provides a gear train so that operation of the motor shaft will be translated to movement of the wiper mechanism 120, in order to clean the windshield 22 of any moisture deposits.

The electric motor 30 comprises a motor frame 31 of U-shaped formation having the parallel legs 32, 33 joined by the bridge portion 34. Upon one of the legs 32 is mounted a pole core 35 supporting a coil 36 and a pole shoe 37, the coil having electrical connection with motor brushes, as will later be explained. The other leg 33 is deformed into a pole shoe member 38 to lie substantially concentric with the armature 39 of the motor, as is the usual practice. Each leg of the motor frame is provided with a substantially dove-tailed opening 40 for the reception of a T-headed bolt 41 which has a threaded portion 42 extending longitudinally from the said legs for means of attaching the gear case 70 to the motor frame, as will later be explained. The bridge portion 34 of the motor frame is provided with a bearing 43 substantially concentric with the pole pieces 37 and 38 before described, in which one end of the armature or motor shaft 44 is journalled. This end of the shaft 44 is provided with a thrust bearing 45, which bears against the thrust cup 46, retained on the motor frame as by peening over the up-standing lugs 47 of the bridge member that protrude through apertured ears 48 of said thrust cup. The thrust cup is of the general formation exhibited by Figs. 16 and 17, and provides a chamber for the reception of an oil retaining member 49, as of felt or the like, and has one portion of the wall pierced and struck outwardly to form a lip 50, through which lubricant may be supplied to the thrust bearing.

The bridge member is provided with means for supporting the motor brushes and transmitting the current impulses between the coil 36 and the armature 39 in the following manner. The bridge portion 34 of the motor frame is apertured at suitable places to provide for the reception of studs 51 and 52, which pivotally support the brush holders 53 and 54, as will be seen by reference to Fig. 19. One of the brush holders is insulatingly supported upon the bridge member as by means of the stud 51 passing through the insulating sleeve or bushing 55 which is firmly received in the aperture in the bridge member. The brush holders are provided near the pivotal end, with a contact lug 56 for connecting one of the leads 57 of the coil winding 35, in one instance, and with the source lead in the other instance. The remaining lead 57 of the coil 36 is electrically connected to a terminal clip 57a, which is insulatingly supported on the bridge 34 by a tubular rivet 57b passing through a sleeve 57c of nonconducting material and having the edge thereof turned over to securely hold the clip 57a in place.

The free ends of the supports 53 and 54 electrically support brush members 58 which cooperate with the cummutator of the motor in the well known and usual manner. The brushes 58 are kept in contact with the commutator, by means of a spring 59 anchored to spring insulators 60, which are received in slots intermediate the ends of the brush holders, as illustrated in Fig. 19. The spring 59 not only keeps the brushes 58 in contact with the armature, but also urges the pivotal end of the brush holders 53 and 54 in embracing engagement with the stud members 51 and 52 respectively.

The gear housing 70 may be a die casting or a grey iron casting of the general formation exhibited in Figs. 11 and 12, and in main comprises the apertured lugs 71 disposed about the exterior of a chambered portion 78, for the reception of screws or bolts for mounting upon the rail 21 of the vehicle, and further provides the motor mounting flange 72, which forms a supporting means for the electric motor. The flange 72 is formed with arcuate slots 73, near the ends thereof, for the reception of corresponding arcuate lugs 74 on the ends of the legs 32 and 33 of the magnet frame; the arcuate slots having apertures 75 through the flange 72 for the reception of the threaded end 42 of the T-bolt 41. By this means of connection proper assembled relation of the gear casing 70 and the motor frame is always assured. The arcuate slots 73 with the cooperating lugs 74, and the T-bolts 41 threaded through the apertures 75 make it possible to assemble in one relation only and when provided with a nut 76 and washer 77 provide a means of securely mounting the motor upon the gear housing. The gear housing 70 is further provided with a chamber 78 having inwardly projecting hollow bosses 79, 80 and 81, which provide bearings for the gear train now to be described.

Through the shank portion 82 of the housing 70 joining the chamber 78 and the flange 72, there is provided a bore 83 terminating in a counter-sink 84, which bore is provided with a shaft bearing 85 for the reception of the shaft 44 of the motor. The motor shaft 44 terminates within the gear housing 70 in a worm 86 adjacent a stop pin 44a set in the wall of the housing 70, which worm meshes with a worm wheel 87 provided with a stud shaft 88, and journalled within the hollow boss 79. The bottom of the hollow boss 79 is fitted with a hardened plug 80a which provides an end bearing for the stud 88. To insure proper lubrication of the shaft the spiral oil groove 89 is provided in the surface of the shaft 88. Eccentric of the worm wheel 87 there is provided a crank pin 89a, which is connected to a link 90. The other end of the link 90 is pivotally connected to an arm 91 of a sector gear 92 as by means of the pintle 93. The sector gear 92 is formed from a sheet metal blank into a substantially U-shaped member, in which one arm thereof forms the member 91 connected to the link 90, and the other arm 94 is formed into a segmental gear which meshes with the pinion 95 attached to the end of the wiper shaft 96. The sector gear 92 is mounted in the gear housing by means of a pin 97 press-fitted into the boss 80 and provided with an annular groove and spring retaining ring 98 for maintaining the sector gear thereon. The wiper shaft 96 is journalled to rotate within the boss 81 and is maintained in proper relation therewith by means of a spring retaining clip 99 fixed to the interior of the casing 70 by means of the attaching screw 100 and bearing against the peened end 101 of the shaft, as shown in Fig. 13.

Enclosing the electric motor and protecting it from dust and the weather, there is provided a cup-shaped housing or cover 102, which encloses the motor and is provided at the edge with an outwardly directed flange 103, which presses against a gasket 104 disposed against the outer edge of the flange 72 of the gear housing 70. Tap screws 105 are passed through openings in the cover member and threaded into openings 106 of the bridge member 34 of the motor frame, and operate to force the cover in tight engagement with the flange 72. At a convenient part of the cover there is provided an opening 107 for the reception of a rubber or other insulating grommet 108, provided with apertures 109 for the reception of the electrical conductors to the interior of the casing.

The wiper shaft 96 is provided exterior of the gear casing with a non-rounded portion 110 which has driving engagement with the wiper mechanism now to be described. The wiper mechanism 120 comprises a wiping arm 121, which is formed of sheet metal pressed into a channel formation as illustrated by the various Figures 2–9 inclusive. The sheet metal blank, part of which is exhibited in Fig. 9, is pressed into an elongated member of channel formation, which forms the longitudinal flanges 122 and provides the lugs 123 and 124, forming a guide means for the reception and guidance of a wiper blade 125. The lugs 123 are pierced to receive a pin 126 which passes through the wiping blade 125 forming a pivotal support therefor. The lugs 124 are formed from extensions of the longitudinal flange 122 and are positioned intermediate the ends of the arms 121 to form a pair of guides on each side of the end of the wiper blade 125. In the present instance the wiper arm 121 consists of a somewhat angular formation, in that it is composed of the shank portion 127 with an angular connecting portion 128 which joins the offset blade supporting portion 129, but may, however, be formed into one straight member if so desired.

For attaching the arm 121 to the wiper shafts 96 the shank portion is provided with a non-rounded aperture 130 corresponding to the non-rounded portion of the wiper shaft 110, but is of such size as to be loosely received thereby. Fig. 9 exhibits the form of the blank from which this portion of the arm is fabricated, and comprises the somewhat elliptical portion 131 which is joined to the main portion of the blank 132, by the neck 133. In forming the connection portion of the arm, the blank is doubled or folded as at 134, so that the portion 131 lies upon the main portion 132 as shown in Figs. 4, 5 and 8. The flanged ears 135 are then struck down against the folded portion 131 to retain the parts 131 and 132 in firmly folded relation providing a reinforced attaching bracket, which is then provided with the aperture 130 for engagement with the wiper shaft extension 110.

Means for retaining the arm 121 in place and in driving relation with the wiper shaft 96 is accomplished by providing the thicker portion of the driving end of the shaft 110 with a substantially annular groove or notch 136 near the extreme end thereof. A spring clip 138 is provided with a non-rounded aperture similar in shape and size to the aperture 130 and of a size to pass over the end of the shaft and be received by the notch 136. The clip is provided with angularly extending ears 139, parallelly disposed and designed to engage the driving end of the arm 121 as shown in Figs. 2, 3, 4 and 5. The clip 138 is further provided with a tang 140 which is bent in circular form to provide an anchorage for a spring 141 connected at the other end to a pin 142, disposed in the aperture 143 of the shank portion of the arm 121.

Where it is desired to use the wiper mechanism in the duplicate or in tandem form (as it is sometimes called) the same form of wiping arm assembly is used, and it is only necessary to provide a slightly different means of supporting the second arm on a rail of the windshield, and to connect the two arms to work in unison. To accomplish this, the bracket 150 is fixed to the rail by screws 151 and has an offset portion 152 which supports a sleeve bearing 153, into which is journalled a stud shaft 154 and retained therein by any suitable means as the annular groove and spring ring 155. The stud shaft 154 is similarly provided with a non-rounded extension 156 for the reception and mounting of the wiper arm 121 and spring clip assembly 138, as has been described heretofore in mounting the wiper arm upon the wiper shaft 96. The protruding end of the sleeve 153 supporting the stud shaft 154 receives a cover nut 157 to present a neat appearance, protect the working parts and which also serves as a grease cup. On the non-rounded portion 156 is mounted the spring clip 138 and the spring 141 which also have an engagement with the pin 142 received in the aperture 143 in the arm 121.

The two wiping arms are connected by a link or tie rod 158 which has pivotal connections with the pins 142 on each of the arms as shown in Figs. 1 and 7. To form lightness and rigidity of the structure, the member 158 is formed from sheet metal into a channel formation with the ends thereof crushed down and pierced to form the pivotal connections 159 with the pins 142. In assembling the connections, a thick washer 144 is placed over the pin 142, being of such a size as to be received between the flanges 122 of the arm 121, and of such a thickness as to provide a smooth surface above the flanges 122 upon which the flattened portion of the arm 158 may rest and so as to insure that the component tension of the spring 141 in the direction of the pin will be against the member 158. Washer 145 is then placed over the pin disposed against the member 158 and is retained in place by any desirable means as a snap ring or cotter pin 160.

By the herein described means of mounting the wiper mechanism upon the shaft connections 110 and 156, it is always insured that the wiper blade 125 will be held against the glass irrespective of the variations in angular association of the windshield on the rail upon which the wiper is mounted. This is due to the offset connection of the spring 141 with respect to the wiper shaft and arm. The spring 141 also maintains the clip 138 seated in the groove 136 in the end of the shaft and provides an anti-rattle device by taking up the slack in the connections between the spring 141, the clip 138, the shaft 110, the arm 121, and the member 159.

While the form of embodiment of the present invention as herein disclosed, constitutes a preferred form, it is to be understood that other forms might be adopted, all coming within the scope of the claims which follow.

What is claimed is as follows:

1. In a windshield cleaner, the combination comprising, an operating shaft, means for operating the shaft, a wiper arm connected to the shaft for operation therewith, yet capable of angular displacement with respect to the said shaft, and means engaging the shaft end and wiper arm tensioning the wiper arm toward the surface to be cleaned said means including a U-shaped spring clip seated in the shaft end, and having ears engaging the arm to hold it in spaced relation therefrom, and a spring coupled to the clip and a part of the wiper arm remote therefrom.

2. In a windshield cleaner, the combination of a wiper arm comprising a piece of sheet metal bent to form an elongated channel member with flanges enlarged at certain points to provide pivoted connection at one end of the arm with a wiper blade, and to provide guide lugs intermediate the arm to engage each side of the blade at one end thereof, a portion of the channel flanges being removed at one end of the arm to provide an elongated flat portion which is doubled over and provided with means to receive the shaft end, and the adjacent portions of the flange being bent against the doubled end portion to reinforce and hold in the doubled position.

3. In a windshield cleaner, the combination comprising, an operating shaft, means for operating the shaft, a wiper arm connected to the shaft for operation therewith, a clip on said shaft having ears engaging the wiper arm at its shaft connection, and a spring connecting said clip and a part of said arm remote from said clip, said spring urging the arm against the windshield glass, maintaining engagement of the clip and shaft, and providing an anti-rattle device for said parts.

4. In a windshield cleaner having a wiper shaft and a wiping arm driven thereby, means for securing the arm upon the shaft and tensioning the same against the windshield surface, comprising in combination, a nonrounded portion of said shaft terminating with a notch in the end thereof, said arm having a nonrounded opening fitting over said shaft end, a spring clip seated in said notch and providing a pair of ears extending along the shaft and engaging the wiper arm, said ears spacing the arm from said shaft end and providing a fulcrum pivot for said arm transverse to said shaft, and a spring coupling said clip to a remote portion of said arm, and biasing the same against the ears and the windshield glass.

5. A windshield cleaner comprising, in combination, an operating shaft, means for operating the shaft, a wiper arm of sheet metal formed to provide a channel member of angular formation and having one end thereof doubled over and provided with a non-rounded hole to engage a non-rounded portion of the wiper shaft, a clip provided with a non-rounded opening to engage a notch in the end of the wiper shaft and a tension device engaging the clip and a portion of the arm.

In testimony whereof I hereunto affix my signature.

ROBERT M. CRITCHFIELD.